Sept. 24, 1957  J. O. P. HUGHES ET AL  2,807,480
FLEXIBLE RESILIENT SLEEVE TYPE JOINT WITH INTERNAL TIE MEANS
Filed Aug. 30, 1954

United States Patent Office 2,807,480
Patented Sept. 24, 1957

2,807,480

FLEXIBLE RESILIENT SLEEVE TYPE JOINT WITH INTERNAL TIE MEANS

John Oliver Philip Hughes, Adolf Frankel, and Jerzy Andrzej Leslaw Latoszynski, Leicester, England, assignors to The English Electric Company Limited, London, England, a British company Application August 30, 1954, Serial No. 452,838

Claims priority, application Great Britain September 18, 1953

4 Claims. (Cl. 285—114)

The invention relates to expansion joints for tubes, which joints are exposed to shear loads owing to lateral and/or angular displacement of the tubes they connect, and to axial and hoop stresses owing to internal pressure.

An expansion joint according to the invention comprises in combination two tubes with their ends substantially in alignment, flanges fixed to the ends of the said tubes, tubular hub portions and spiders connecting the same to the said tubes, a tie rod passing through the said hub portions with ample clearance and tying the same together laterally and angularly yieldable, an outer rubber sleeve, flanges bonded to the ends of the said rubber sleeve, and tightly connected to the said flanges at the ends of said tubes, and metal wire closely encircling the said outer rubber sleeve relieving the same from hoop stresses, concave part-spherical seatings arranged on the said hub portions, convex part-spherical end portions arranged on the said tie rod and co-operating with the said seatings, lids tightly closing the said hub portions at their ends facing away from one another, an inner rubber sleeve tightly connecting the ends thereof facing towards one another, the said lids, hub portions and inner rubber sleeve enclosing a compartment filled in operation with a liquid lubricant, and rigid rings arranged with axial clearance between the opposite end faces of the said hub portions and supporting the said inner rubber sleeve against external pressure.

Preferably the said metal wire consists of separate hoops lying side by side, the said hoops having a profile of increased radial depth sufficient to prevent adjacent hoops from overlapping one another within the operational range of movement of the joint.

The said metal wire may be bonded to the said outer rubber sleeve. Preferably said wire has a U-shaped cross section, open at the circumference.

Within predetermined limits neither the tie rod nor the metal hoops interfere then with any lateral or angular relative displacements of the two tubes connected with one another by the said joint.

Figure 1:
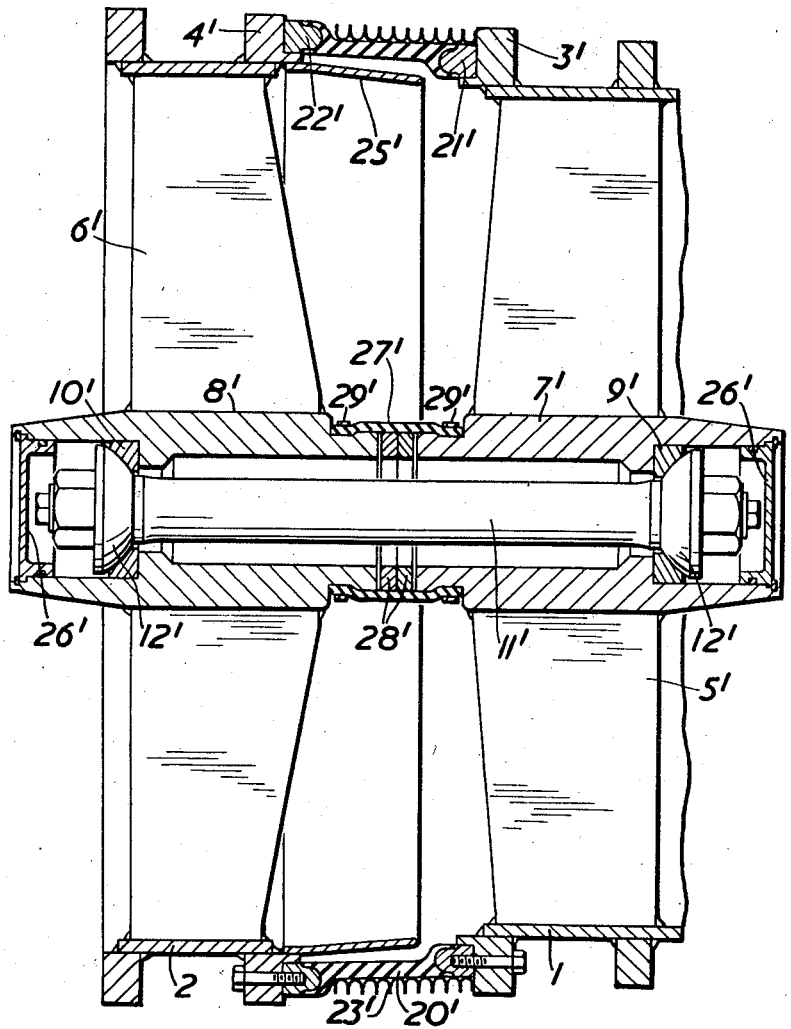
Figure 2:
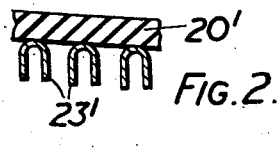

In order that the invention may be clearly understood and readily carried into effect, some embodiments thereof will now be described by way of example with reference to the accompanying drawings in which:

Fig. 1 is a longitudinal section of an expansion joint according to the invention, and Fig. 2 is a detail thereof on a larger scale.

Referring first to Fig. 1, the tubes 1, 2 have at their ends flanges 3', 4' respectively, welded on externally, and spiders 5', 6' respectively, welded in internally. These spiders have tubular hub portions 7', 8' respectively, the ends of which facing away from the joint have part-spherical concave seatings 9', 10' respectively. A tie rod 11' passes through the tubular hub portions 7', 8' with ample clearance, and has two special nuts 12' screwed to its ends which rest with convex part-spherical faces on the seatings 9', 10' respectively.

A rubber sleeve 20' is bonded to two flanges 21', 22' which are screwed to the tube flanges 3', 4' respectively. Wire hoops 23' snugly encircle the said rubber sleeve 20' at intervals sufficient to allow the sleeve to be deformed as required for compensating lateral or angular misalignment of the tubes 1, 2 but small enough to relieve the sleeve 20' from hoop stresses owing to internal fluid pressure.

A cylindrical screen 25' may be provided on one of the tube flanges, say 4', to screen the joint from inside, while leaving a gap between its free end and the other flange, say 3', so as not to affect the mobility of the joint.

The tie rod 11', the part-spherical seatings 9', 10' and special nuts 12' are completely enclosed in a space filled with lubricating oil, to ensure the mobility of the joints to be preserved in operation.

For this purpose, liquid- and gas-tight lids 26' are inserted in the ends of the hub portions 7', 8' facing away from one another while the ends thereof facing towards one another are connected by a rubber sleeve 27' clamped tightly to them by means of circular clips 29'. Between these ends of the hub portions 7', 8' the rubber sleeve 27' is supported from inside against external pressure by rigid rings 28' arranged with axial clearance from the inner end faces of the said hub portions 7', 8'.

The said inner screen 25' protects the outer rubber tube 20' from direct contact with the flowing medium.

Fig. 2 shows on a larger scale the U-shaped wires 23' the cross section of which has a radial depth sufficient to prevent adjacent hoops from overlapping one another within the range of lateral movement for which the joint is designed.

If desired, the wire hoops may be bonded to or into the rubber of the sleeve 20'.

The term "rubber" is to be understood herein to include both natural and artificial rubber.

What we claim as our joint invention and desire to secure by Letters Patent, is:

1. An expansion joint, comprising in combination two tubes with their ends substantially in alignment, flanges fixed to the ends of the said tubes, tubular hub portions and spiders connecting the same to the said tubes, a tie rod passing through the said hub portions with ample clearance and tying the same together laterally and angularly yieldable, an outer rubber sleeve, flanges bonded to the ends of the said rubber sleeve and tightly connected to the said flanges at the ends of said tubes, and metal wire closely encircling the said outer rubber sleeve relieving the same from hoop stresses, concave part-spherical seatings arranged on the said hub portions, convex part-spherical end portions arranged on the said tie rod and co-operating with the said seatings, lids tightly closing the said hub portions at their ends facing away from one another, an inner rubber sleeve tightly connecting the ends thereof facing towards one another, the said lids, hub portions and inner rubber sleeve enclosing a compartment filled in operation with a liquid lubricant, and rigid rings arranged with axial clearance between the opposite end faces of the said hub portions and supporting the said inner rubber sleeve against external pressure.

2. An expansion joint as claimed in claim 1, wherein the said metal wire consists of separate hoops lying side by side, the said hoops having a profile of increased radial depth sufficient to prevent adjacent hoops from overlapping one another within the operational range of movement of the joint.

3. An expansion joint as claimed in claim 1, wherein the said metal wire is bonded to the said outer rubber sleeve.

4. An expansion joint as claimed in claim 1, wherein the said wire has a U-shaped cross section, open at the circumference.

References Cited in the file of this patent

UNITED STATES PATENTS

| | | |
|---|---|---|
| 720,580 | Greenfield | Feb. 17, 1903 |
| 2,047,904 | Hollatz | July 14, 1936 |
| 2,456,234 | Young | Dec. 14, 1948 |

FOREIGN PATENTS

| | | |
|---|---|---|
| 10,321 | Great Britain | July 23, 1887 |
| 164,378 | Germany | Nov. 28, 1905 |
| 128,531 | Switzerland | June 12, 1926 |